United States Patent
Stolworthy et al.

(10) Patent No.: US 10,619,980 B2
(45) Date of Patent: Apr. 14, 2020

(54) DUST CONTAINMENT UNIT MANIFOLD

(71) Applicant: Action Target Inc., Provo, UT (US)

(72) Inventors: Dean Stolworthy, Las Vegas, NV (US); Darren Wall, Payson, UT (US)

(73) Assignee: ACTION TARGET INC., Provo, UT (US)

( * ) Notice: Subject to any disclaimer, the term of this patent is extended or adjusted under 35 U.S.C. 154(b) by 426 days.

(21) Appl. No.: 14/996,773

(22) Filed: Jan. 15, 2016

(65) Prior Publication Data

US 2016/0209057 A1    Jul. 21, 2016

Related U.S. Application Data (60) Provisional application No. 62/104,614, filed on Jan. 16, 2015, provisional application No. 62/105,052, filed on Jan. 19, 2015.

(51) Int. Cl.
| | |
|---|---|
| *B01D 50/00* | (2006.01) |
| *F41J 13/02* | (2009.01) |
| *B01D 45/16* | (2006.01) |
| *A47L 9/16* | (2006.01) |
| *B03C 3/155* | (2006.01) |
| *F41J 11/00* | (2009.01) |
| *B08B 15/02* | (2006.01) |
| *F24F 13/068* | (2006.01) |
| *A47L 5/38* | (2006.01) |

(52) U.S. Cl.
CPC .............. *F41J 13/02* (2013.01); *B01D 45/16* (2013.01); *A47L 5/38* (2013.01); *A47L 9/165* (2013.01); *A47L 9/1625* (2013.01); *A47L 9/1683* (2013.01); *B03C 3/155* (2013.01); *B08B 15/026* (2013.01); *F24F 13/068* (2013.01); *F41J 11/00* (2013.01); *Y10S 55/03* (2013.01)

(58) Field of Classification Search
CPC ...... A47L 9/1683; A47L 9/165; A47L 9/1625; A47L 5/38; Y10S 55/03; B01D 45/16; F41J 13/02; F41J 11/00; B03C 3/155; B08B 15/026; F24F 13/068
See application file for complete search history.

(56) References Cited

U.S. PATENT DOCUMENTS

| | | | |
|---|---|---|---|
| 2,483,690 A * | 10/1949 | Carlson ................. | B01D 45/02 55/300 |
| 3,222,707 A * | 12/1965 | Allenbaugh .......... | B08B 15/026 15/345 |
| 3,443,505 A * | 5/1969 | Kaufman, Jr. ......... | A21C 15/00 99/517 |
| 3,722,182 A | 3/1973 | Gilbertson | |
| 3,988,131 A | 10/1976 | Kanazawa et al. | |
| 4,047,913 A | 9/1977 | Okamura | |
| 4,114,521 A | 9/1978 | Busch | |
| 4,164,901 A | 4/1979 | Everett | |
| 4,177,835 A | 11/1979 | Paley | |

(Continued)

*Primary Examiner* — Dung H Bui
(74) *Attorney, Agent, or Firm* — Bateman IP (57) ABSTRACT

A dust containment manifold includes an angled, broadened head with one or more openings through which suction is applied to bullets as they fall from a deceleration chamber or bullet trap. The dust containment manifold may be disposed generally beneath the bullet trap and angled so as to reduce the chance that small fragments will enter the bullet trap ventilation system and become lodged in the ventilation filters.

20 Claims, 7 Drawing Sheets

(56) References Cited

U.S. PATENT DOCUMENTS

| | | | |
|---|---|---|---|
| 4,243,616 A | | 1/1981 | Wyss |
| 4,293,320 A | | 10/1981 | Robinson |
| 4,598,631 A | | 7/1986 | Everett |
| 4,744,910 A | | 5/1988 | Bossard |
| 4,786,059 A | * | 11/1988 | Barini .................. F41J 13/00 |
| | | | 273/403 |
| 5,064,457 A | | 11/1991 | Weber |
| 5,242,245 A | | 9/1993 | Schellstede |
| 5,312,465 A | | 5/1994 | Riutta |
| 5,322,533 A | | 6/1994 | Todorovic |
| 5,433,763 A | | 7/1995 | Shagott et al. |
| 5,715,739 A | * | 2/1998 | White .................. F41J 13/02 |
| | | | 273/404 |
| 5,811,718 A | * | 9/1998 | Bateman .................. F41J 13/00 |
| | | | 273/394 |
| 6,067,953 A | | 5/2000 | Bloomer |
| 6,413,476 B1 | | 7/2002 | Barnhart |
| 6,550,688 B1 | | 4/2003 | Uglietto |
| 6,730,167 B2 | | 5/2004 | Shutic et al. |
| 6,746,325 B2 | | 6/2004 | Crane |
| 7,140,615 B1 | * | 11/2006 | Sovine .................. F41J 13/00 |
| | | | 273/410 |
| 2007/0072537 A1 | | 3/2007 | Bateman |
| 2007/0220849 A1 | * | 9/2007 | Ryan .................. A47L 5/38 |
| | | | 55/429 |
| 2007/0234690 A1 | * | 10/2007 | Ryan .................. A47L 5/38 |
| | | | 55/429 |
| 2014/0216333 A1 | * | 8/2014 | Hoversten ............ B05B 16/405 |
| | | | 118/308 |
| 2015/0300224 A1 | * | 10/2015 | Kira .................. B04C 5/04 |
| | | | 55/461 |

* cited by examiner

DUST CONTAINMENT UNIT MANIFOLD

BACKGROUND

State of the Art

The present invention relates to ventilation systems used in indoor firing range enclosures for training in the firing of pistols and other firearms. More specifically, the present invention relates to a ventilation port and manifold which prevent bullet fragments from entering the ventilation system, reducing wear on fine particulate filters.

Field of Art

In order to maintain proficiency in the use of firearms, it is common for law enforcement officers, members of the military, and sportsmen to engage in target practice to improve or maintain their skills. However, indoor gun firing range enclosures present particularly difficult problems for proper ventilation because of the velocity of the bullets and the lead they contain.

Almost all of America's estimated 10,000 gun ranges permit the firing of lead-based bullets. Lead-based ammunition, however, can fragment into dust-sized particles upon impact with certain projectile traps, spreading toxic lead vapor and dust. High levels of lead exposure are known to cause a variety of health effects. The concentration of these contaminants must not be allowed to build up in the atmosphere of the shooting range, but due to regulations and general safety concerns, these contaminants cannot be released outside.

Thus, managing bullet fragments and dust is critical for shooting ranges. One method of reducing the production of lead dust is to deploy projectile traps adapted to lack curving internal surfaces. A bullet entering such a system is decelerated by the deflection of the bullet off plates, resulting in more bullet chunks and less dust, because the bullet does not 'skid' along an extended curving surface. Such skidding can strip layers of lead from the surface of the decelerating bullet, resulting in large quantities of fine lead dust.

Further, many ranges have adapted their equipment to draw air through the bullet trap and into filters, producing a negative air pressure not only within the trap, but often across the range as well. This ventilation system traps fine particles of dust in the filters, virtually eliminating dust accumulation in the bullet trap area. This improves safety for range workers who must remove and recycle spent bullets. The bullet-trap ventilation system also prevents dust-laden air from drifting back towards the shooters.

However, drawing air from the bullet trap and into filters can create further problems. Bullets ultimately may fragment into many small pieces during deceleration, producing fragments small enough to be carried by strong air flow. Some of these fragments may be drawn into the range's ventilation system, instead of falling into collector bins or channels. Thus the negative air pressure may unnecessarily pull lead from the trap that would otherwise be removed by a collection system at the bottom of the trap.

Once in the ventilation system, such fragments may become caught in the filters used to trap aerosolized lead or other metals, requiring frequent and costly filter replacement. The fragments may accumulate to the point of reducing airflow, requiring the ventilation system to be disassembled in order to remove them.

Heretofore, bullet traps have included various apparatuses for preventing lead and other fragments from passing through the traps and into the ventilation system. Some of the methods used include increasing stages of filtration, magnetized plates, and most often, long lengths of ventilation tubing which encourage the fragments to settle. These solutions, however, respectively require frequent maintenance, expensive mechanisms, and a great deal of space and periodic cleaning, and do not adequately solve the problem.

SUMMARY OF THE INVENTION

The following summary of the present invention is not intended to describe each illustrated embodiment or every possible implementation of the invention, but rather to give illustrative examples of application of principles of the invention.

In some embodiments, the dust containment manifold comprises an airflow head having a broad end and a narrow end, the broad end generally tapering to the narrow end, the narrow end being adapted to attach to a bullet trap ventilation system, the broad end having at least one opening therein. The broad end is attached to a bullet containment chamber having a bullet guide with a chute. This allows bullets and bullet fragments to pass out of the bullet containment chamber of the bullet trap and into a collection system, such as a bucket, a screw auger or other disposal system.

In accordance with one aspect of the present disclosure, the dust containment manifold is adapted to attach to a bullet trap. For example, a portion of the bullet guide may include holes for rivets or bolts, or may be welded to the bullet trap.

In accordance with one aspect of the disclosure, the bullet guide may have a solid side and a perforated side. The perforated side may have at least one opening in communication with the broad end of the airflow head.

In accordance with another aspect of the disclosure, one or both of the solid side and the perforated side may be angled. The advantage therein may be that bullet fragments are less likely to become caught on the openings of the perforated side of the bullet guide, while maintaining sufficient airflow to remove dust and fine particulate matter.

In some embodiments, both the solid side and the perforated side are angled, further decelerating bullets and bullet fragments, while preventing the perforated side of the bullet guide from becoming bent or chipped by bullets that have not been sufficiently decelerated by the bullet trap. The solid side and the perforated side may be, for example, angled towards one another, so that the portion of the bullet guide leading to the bullet catchment or disposal system is narrower than the portion of the chute opening into the bullet trap. It will be recognized by one of skill in the art that the precise angle may depend on the layout of the particular range and the caliber and type of bullet most commonly fired.

In accordance with one aspect of the disclosure, the airflow head may be bent, curved, or otherwise attached to the bullet containment chamber guide at an angle, so that the airflow head is not level with the ground. This may have the advantage of rendering the narrow end of the airflow head more easily accessible. The bullet trap ventilation system may thus be more easily attached or removed for cleaning.

In accordance with still yet another aspect of the disclosure, the bullet guide is disposed on the bottom quarter of the bullet trap. This has the advantage of employing gravity to assist the heavier bullets and bullet fragments to move towards the bullet catchment/disposal system in place. The bullet catchment/disposal system may be, for example, buckets, barrels, an auger, or a trough suitable for containing lead. In addition, the airflow provided by the airflow head draws dust and fragments downwards, where they are unlikely to escape into the area of the range where a shooter may stand.

In accordance with still another aspect of the disclosure, the bullet guide has an attachment flange to improve positioning on and attachment to the bullet trap. It will be appreciated that the flange need not be flat. It may be curved or angled, depending on the shape of the bullet trap. In some embodiments, the flange contains holes or notches for bolts, or areas suitable for riveting, or clamping.

In accordance with still another aspect of the disclosure, the airflow head may be removably attached to the bullet guide. In this manner, the airflow head can be easily removed from the bullet guide for cleaning, when necessary, or for replacement if a part becomes worn. It will be appreciated that any means of removable attachment may be employed, such as bolts, screws, a clip, or a spring, etc.

In accordance with still another aspect of the disclosure, the perforated side of the bullet guide may further be equipped with a retaining protrusion, such as a ledge or a clamp. This assists in retaining the airflow head in position, even if the bullet trap and bullet guide are vibrating due to, for example, repeated bullet impacts.

In accordance with another aspect of the disclosure, the perforated side of the bullet guide has three or more openings. Multiple openings improve the strength and stability of the dust containment manifold, as it allows cross-members between the upper and lower walls thereof.

In accordance with still another aspect of the disclosure, the openings of the perforated side of the bullet guide are shaped to maximize airflow, while minimizing the number of bullet fragments drawn into the bullet trap ventilation system. It will be appreciated that many irregular shapes could be suitable for varying range conditions and varying ordinance. For example, narrower openings on the top side—the side closest to the bullet trap—permit fewer bullet fragments to enter the airflow head. Wider openings on the bottom side—the side closest to the bullet catchment system—maximize airflow and permit any accidentally-indrawn bullet fragments to escape.

In some embodiments, the bullet guides are modular, and can be attached end-to-end in a linear row. Thus, the bullet guides can be manufactured in short segments which are easier to ship, and can be linked together to accommodate any width of shooting range and any number of bullet traps. The bullet traps may be linked together by, for example, welding, bolts, rivets, clamps, or any other attachment means.

In accordance with another aspect of the disclosure, the invention may be practiced by attaching bullet guides on bullet traps, affixing the airflow heads to the bullet guides, and applying airflow to the airflow heads. Airflow may be generated by, for example, fans, a built-in bullet trap ventilation system, a range ventilation system, or any device capable of producing suction. In some embodiments, the bullet guide is further secured to a bullet catchment device, such as a shaped trough, the edge of a barrel, a bucket system, an auger, or any other means of adequately containing lead and lead fragments.

In some embodiments, airflow heads may be supplied with bullet guides, allowing easy on-site installation of a dust containment manifold.

These and other aspects of the present invention are realized in a dust containment manifold as shown and described in the following figures and related description. It will be appreciated that various embodiments of the invention may not include each aspect set forth above and aspects discussed above shall not be read into the claims unless specifically described therein.

BRIEF DESCRIPTION OF THE DRAWINGS

Various embodiments of the present disclosure are shown and described in reference to the numbered drawings.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinarily skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" and refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 1:
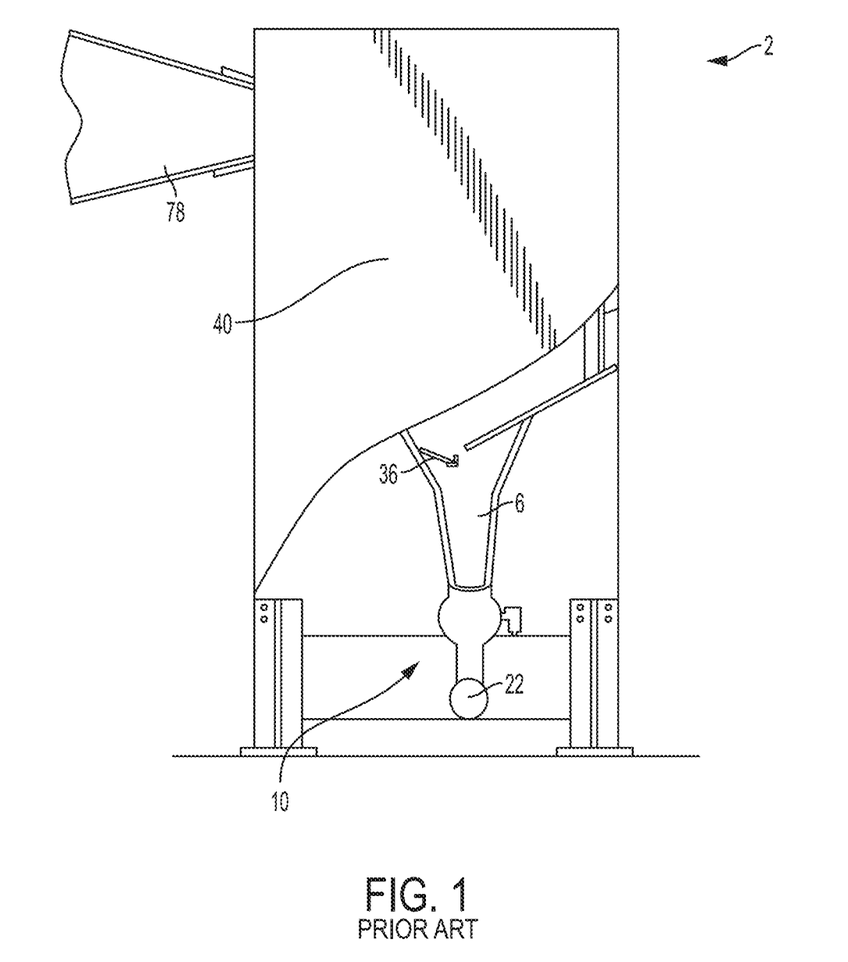
FIG. 1 illustrates a known pneumatic bullet disposal system.

Turning now to FIG. 1, there is shown a side, partially cut-away view of a bullet disposal/dust containment system of the prior art (U.S. Pat. No. 7,140,615) generally indicated at 2. The dust containment system 2 includes a funnel 78 through which bullets are fired, and a bullet deceleration chamber 40 (partially obscured by a sidewall) for decelerating bullets. Bullets then fall past a check plate 36, and into a hopper 6 which is disposed in communication with a transport mechanism, generally indicated at 10 for carrying bullets away from the hopper. The transport mechanism is disposed below a selectively openable valve and is formed by a transport tube 22 through which negative pressure is drawn, thus forming a suction tube having a vacuum of sufficient strength to move both lead bullets and fragments and the dust and air from the chamber. The dust and air are then drawn off, while the bullets drop into a collection barrel. While effective, this system requires a very large negative pressure, as the spent bullets must be moved by air flow alone, and generating such pressure requires special hardware. Such a system may include a separation mechanism downstream to remove the bullets and fragments from the dust-laden air.

Figure 2:
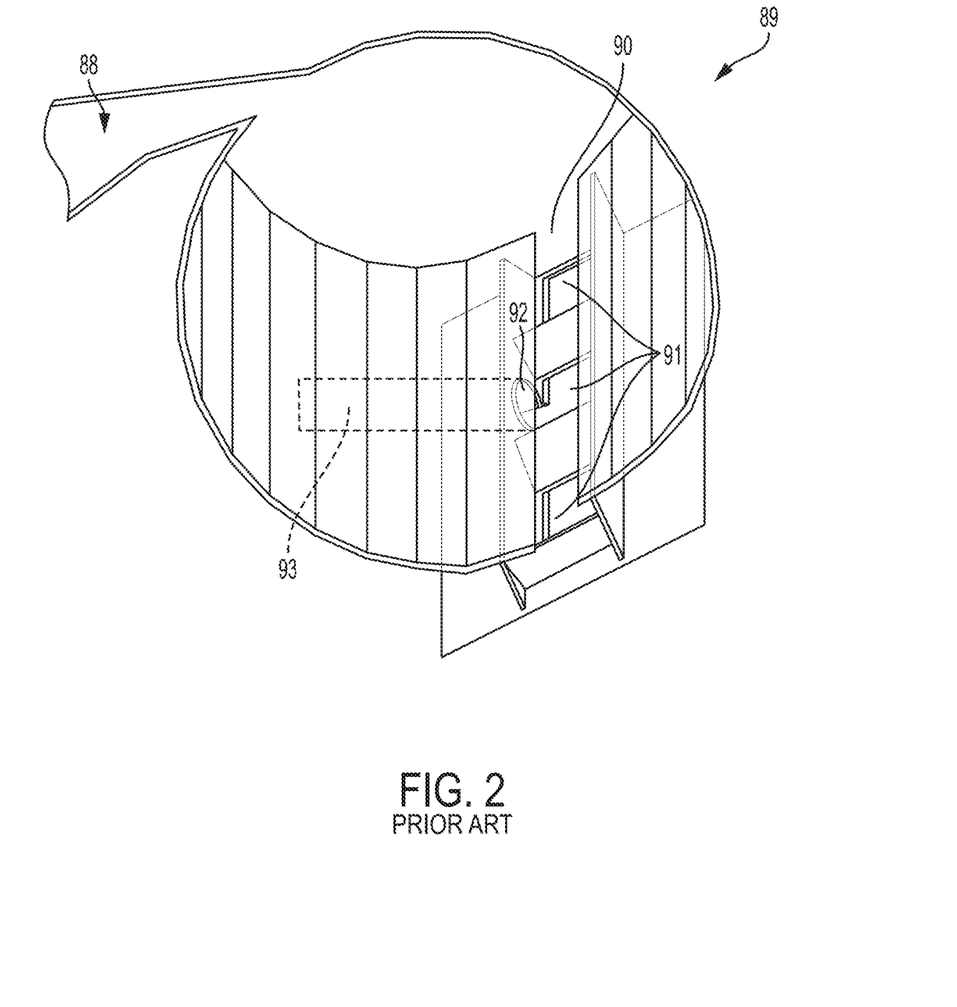
FIG. 2 shows a cut-away view of one known variety of ventilation system installed on a bullet trap.

FIG. 2 displays another known system in which dust can be separated from falling bullets and bullet fragments. Bullets enter a bullet trap, generally indicated at 89, at the end of a shooting range 88. After deflecting off multiple angled surfaces within the trap, the bullets fall into a gap, 90. Several holes 91 open at the bottom of the gap 90 allow spent bullets to exit the bullet trap. In order to separate dust from the bullets, a single air hole 92 is installed along one side of the gap 90. When negative air pressure is applied to the air hole 92, dust exits the gap 90 via a shaft 93. While this system is effective at removing lead dust contaminated air, the small fragments of bullets also may be drawn into the shaft, as well as dusty air. These fragments may then become lodged in filters within the ventilation system, and the filters then require cleaning/replacement.

Figure 3:
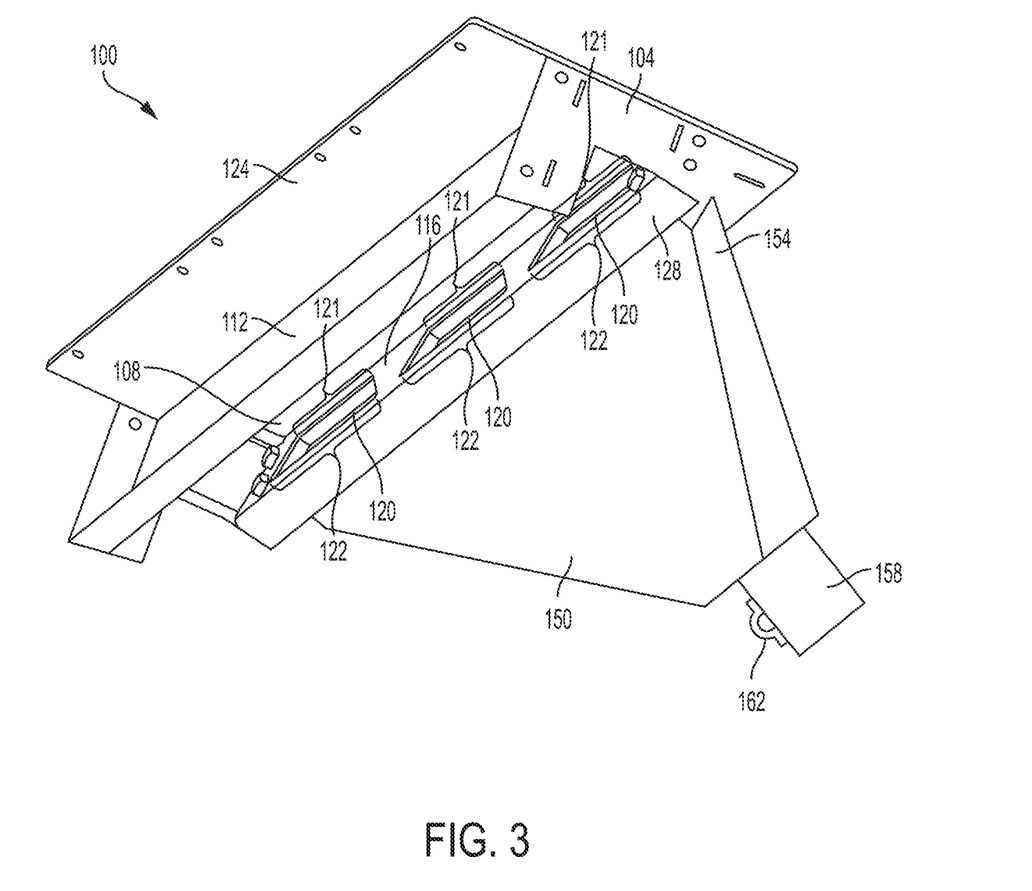
FIG. 3 illustrates a bottom view of a dust containment manifold in accordance with the present disclosure.

FIG. 3 shows a dust collection manifold, generally indicated at 100, made in accordance with the teachings of the present invention. A bullet guide 104 may be attached to generally the bottom portion of a bullet trap (not shown in FIG. 3) and may be further attached to an airflow head 150. The bullet guide may include a chute 108 to allow the communication of bullets from the bullet trap into a variety of bullet collection systems.

The bullet guide 104 may include a solid side 112 and a side having one or more holes or openings. (The holes may be of various sizes and formed in various ways. For convenience, the term "perforated side" is used herein to mean a wall having one or more openings or gaps through which air may be drawn). The perforated side 116 may be in communication with the airflow head 150. The solid side 112 and the perforated side 116 may be angled relative to the ground, depending on the type of bullet collection system and bullet trap selected. For example, the solid side 112 may tilt inwardly, so that bullets fall out of a narrower gap than the gap by which they enter the bullet guide 104. This absorbs much of the remaining kinetic energy of the bullets. The solid side 112 may tilt outwardly, resulting in a greater spread of bullets and bullet fragments as they exit the bullet guide 104, so that they fill the bullet collection device more evenly. The perforated side may be angled outwardly, to protect the side openings 120 from stray bullet/fragment impacts.

The bullet guide 104 may also have an attachment flange 124 adapted to conform to the shape of the bullet trap. The attachment flange 124 may be flat, or may be shaped to conform to the external surface of a bullet trap—for example, the attachment flange 124 may be curved or bent. It will be appreciated that the attachment flange 124 may be shaped to fit within the bullet trap, or between layers of the body of the bullet trap, in order to more securely fasten the bullet guide 104 to the bullet trap. The attachment flange 124 may also be adapted to more easily secure it to the bullet trap—for example, it may have precut holes for bolts or screws, or may be formed of metals suitable for easy welding.

As shown in FIG. 3, a retaining protrusion 128 may be included—in this case, a ledge—for retaining the airflow head 150 in position. The retaining protrusion 128 may also be, for example, clamps, clips, or springs, suitable for keeping the airflow head 150 in alignment with the openings 120.

It will be appreciated that the one or more openings 120 may be regularly or irregularly shaped, in order to improve airflow and reduce the number of bullet fragments entering the airflow head 150, while still providing for ease of manufacture and installation. For example, the top width 121 may be less than the bottom width 122, reducing the aperture of the opening 120 near the bullet trap, but increasing the aperture of the opening 120 near the bullet catchment. In other configurations, the top width and bottom width may be the same, or the bottom width may be larger, depending on the desired outcomes for the system.

The bullet guide 104 may be attached to the airflow head 150 by, for example, rivets or welding, but one important advantage of the present invention is that the bullet guide 104 may also be releaseably attached to the airflow head 150. This may be accomplished, for example, by bolts, clips, a vice, or springs. In this manner, the airflow head 150 can be removed from the bullet guide 104 to allow for easy cleaning or repair. The parts can also be shipped and installed separately, reducing transportation costs.

Figure 4:
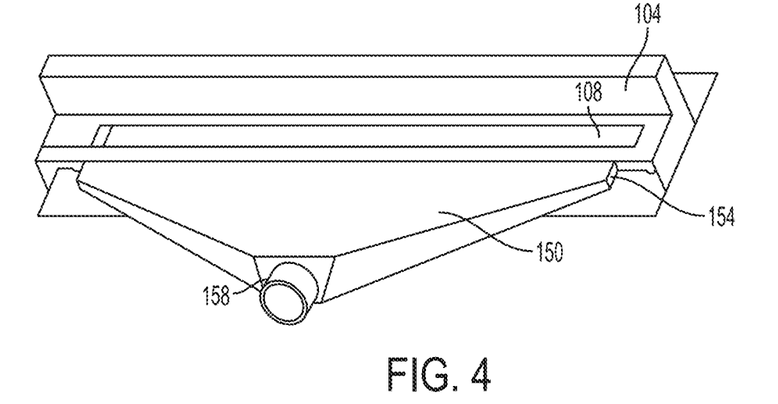
FIG. 4 shows a view from behind the airflow head, displaying the narrow end attachment for a bullet trap ventilation system.

FIG. 4 is a rear view of the dust containment manifold, showing the airflow head 150 and the bullet guide 104. The narrow end 158 of the airflow head 150 is adapted to attach to a bullet trap ventilation system. It will be appreciated from FIG. 4 that the cross-sectional area of the void in the manifold adjacent the chute 108 is many times larger (typically 3-20 times) than the cross-sectional area at the void in the manifold at the narrow end 158. Thus, the flow rate of air near the openings 160 formed in the airflow head 150 at the broad end 154 is substantially lower than the airflow rate near the narrow end 158—thereby substantially decreasing small bullet fragments drawn in through the openings 160 of the airflow head 150 and carried to the narrow end 158 and on into the filtration system. It will be appreciated that the narrow end 158 may also be disposed higher than the portion of the broad end 154 of the manifold adjacent the chute 108 to further reduce the risk of bullet fragments entering into the narrow end and ultimately the filters.

Figure 5:
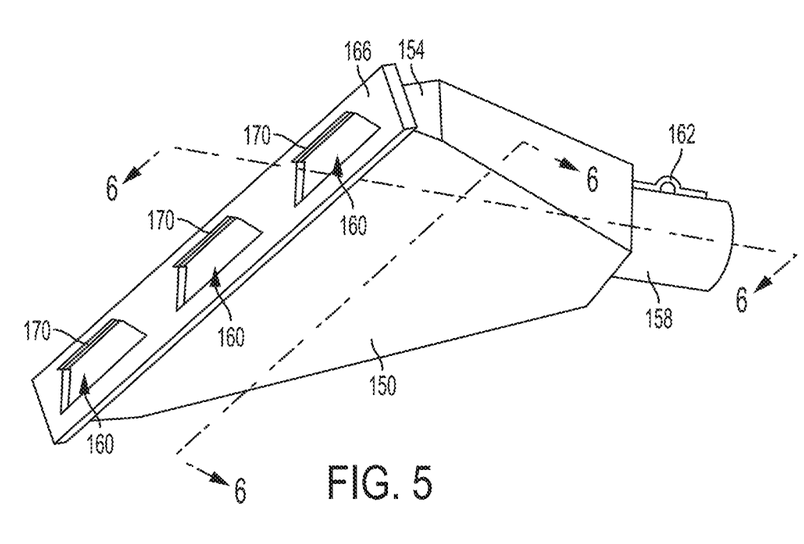
FIGS. 5 and 6 shows a perspective view and cross-sectional view, respectively of one embodiment of the airflow head.

FIG. 5 is a view of the airflow head 150, including the narrow end 158 and the broad end 154. The broad end 154 may be equipped with a plate 166, or broad end plate, which may form the openings 160. The broad end plate 166 may be comprised of a variety of materials, for example, ¼ inch hardened steel, in order to provide a secure attachment point for the bullet guide 104 (not pictured in FIG. 5). The broad end plate 166 may also, for example, increase structural stability of the airflow head 150, and provide impact resistance. The broad end plate 166 may also feature one or more interlocking lips 170, positioned to engage with the openings 120 of the bullet guide 104.

Figure 6:
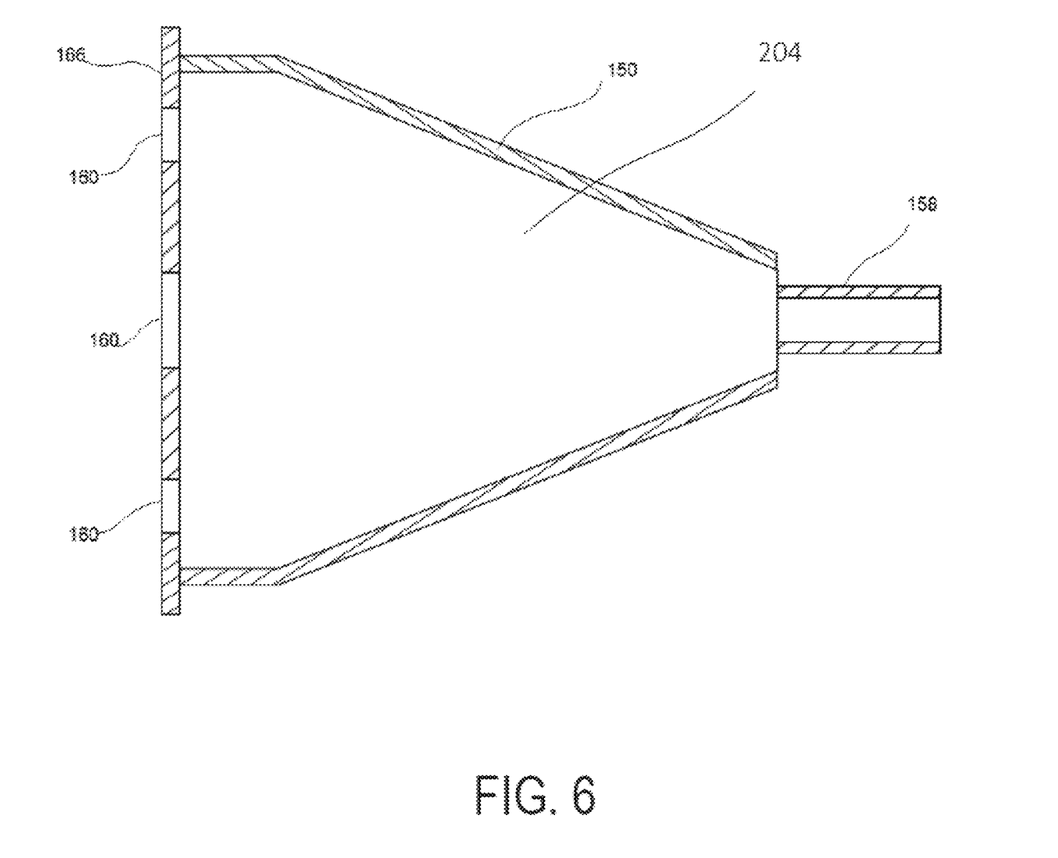

In some embodiments, the narrow end 158 of the airflow head 150 is equipped with a thumb-depressible clip 162 or other mechanism for releaseably securing the bullet trap ventilation system to the narrow end 158 of the airflow head 150. While not shown, those skilled in the art will understand a bullet trap ventilation system typically includes a duct for carrying lead contaminated air, a fan for creating a negative pressure in the duct, and a filter for removing lead dust from the air. The clip 162 feature allows users to easily remove the dust collection manifold 100 from the ventilation system for cleaning or for repair to either the dust collection manifold 100 or the ventilation system. FIG. 6 shows a cross-section of the airflow head 150 including the void 204.

Figure 7:
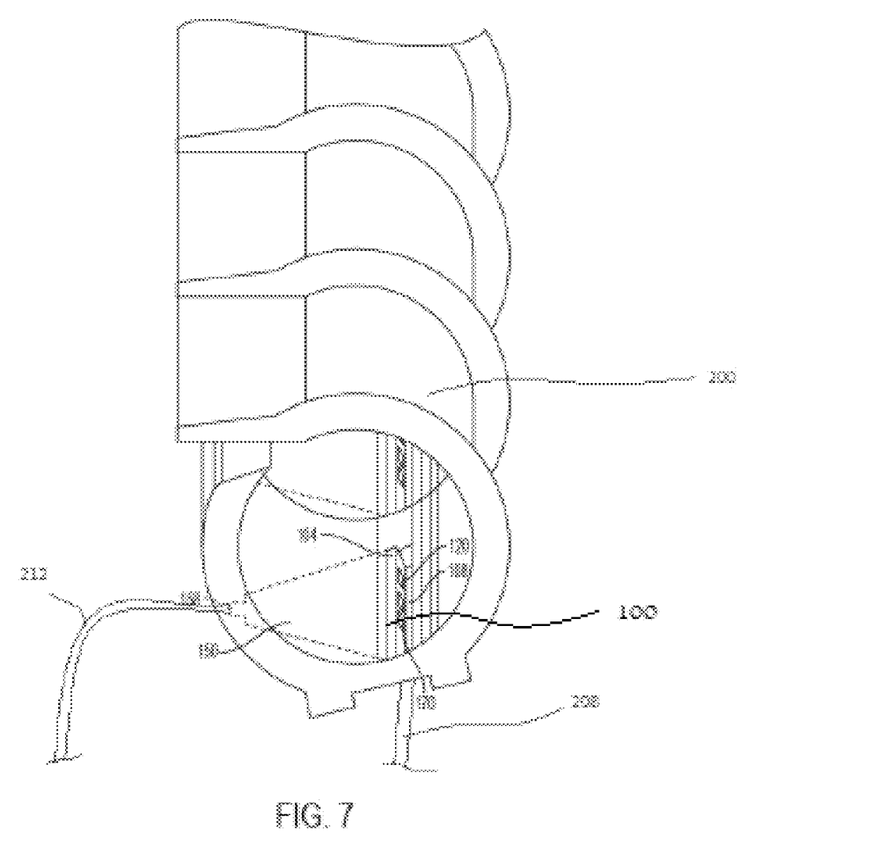
FIG. 7 illustrates a view of the dust containment manifold attached to a bullet trap.

Turning now to FIG. 7, there is shown a cut-away view of the dust collection manifold 100 mounted beneath a bullet trap 200, allowing for the egress of bullets via a chute 108. The bullet guide 104 is in communication with the inside of the bullet trap, and in some embodiments the air flow head 150 extends at a downwardly sloping angle from the bullet guide 104, allowing for easy access to the narrow end 158. After an incoming bullet deflects off the internal angles of the bullet trap, it falls through the bullet guide 104, past the openings 120 therein. Also shown are the interlocking lips 170, which protrude from the airflow head 150 and into the openings 120 of the bullet guide 104, in order to more securely attach the airflow head 150 to the bullet guide 104. This configuration has the advantage of preventing a crease or crack from developing between the bullet guide 104 and the airflow head 150, in which dust or bullet debris might accumulate. The airflow head 150 is connected to the ventilation system 212 and is positioned above the disposal system 208.

In some embodiments, the bullet guides 104 are modular, and can be attached end-to-end in a linear row. Thus, the bullet guides 104 can be manufactured in short segments which are easier to ship, and can be linked together to accommodate any width of shooting range and any number of bullet traps. The bullet traps may be linked together by, for example, welding, bolts, rivets, clamps, or any other attachment means.

In some embodiments, airflow heads 150 may be supplied with bullet guides 104, allowing easy on-site installation of a dust containment manifold.

Described herein is a dust containment manifold comprising: an airflow head having a broad end and a narrow end, the broad end generally tapering to the narrow end, the narrow end being adapted to attach to a bullet trap ventilation system, the broad end having at least one opening therein; and a bullet guide having a chute for the communication of bullets and bullet fragments, the airflow head being attachable to the bullet guide. The bullet guide may be adapted to attach to a bullet trap. The chute may be defined by a solid side and a perforated side, the perforated side having at least one opening in communication with the broad end of the airflow head.

In some configurations, the solid side of the bullet guide may be angled. The perforated side of the bullet guide may be angled in the same direction. In other configurations, the solid side and the perforated side may be angled in opposing directions.

The airflow head may be disposed at an angle of at least ten degrees relative to the bullet guide. The airflow head may be attached to a broad end plate, the broad end plate comprising an interlocking lip adapted to fit inside the openings of the bullet guide. The airflow head may have a void in the broad end which as has a cross-sectional area of at least 3 times that of a cross-sectional area of a void in the narrow end. The bullet guide may be disposed generally at a bottom quarter of the bullet trap. The bullet guide may further comprise an attachment flange adapted to conform to an external surface of the bullet trap.

In some configurations, the bullet guide is removeably attached to airflow head. The bullet guide may further comprise a retaining protrusion on the perforated side, for securing the airflow head. The perforated side may further comprise at least three openings. The openings may have a top width and a bottom width, wherein the top width is less than the bottom width.

In some configurations, the bullet guide is modular, such that several bullet guides may be attached together in a linear row.

Also disclosed herein is a method of forming a dust collection system comprising the steps of: disposing a bullet guide having a chute on a bullet trap; selecting an airflow head having a narrow end and a broad end; attaching the broad end of the airflow head to the bullet guide; and connecting the narrow end to a suction source and filter system. The method may also comprise the step of securing the bullet guide to a bullet catchment device, such that a bullet passes from the bullet trap to the bullet catchment device.

Further disclosed herein is a kit for a dust collection system, the kit comprising an airflow head having a broad end and a narrow end, the broad end generally tapering to the narrow end, the narrow end being adapted to attach to a bullet trap ventilation system, the broad end having at least one opening therein; and a bullet guide having a chute for the communication of bullets and bullet fragments.

Thus there is disclosed a dust collection manifold system and methods of using the same. It will be appreciated that numerous modifications may be made without departing from the scope and spirit of this disclosure. The appended claims are intended to cover such modifications.

What is claimed is:

1. A dust containment manifold comprising:
an airflow head having a broad end and a narrow end and a void within the airflow head, the broad end generally tapering to the narrow end, the narrow end being adapted to attach to a bullet trap ventilation system, the broad end having at least one opening therein; and
a bullet guide having a chute for the communication of bullets and bullet fragments from a bullet trap to a disposal system, the chute having an upper opening and a lower opening, such that bullets from a bullet trap pass into the upper opening and out the lower opening, and a side opening, the airflow head being attachable or attached to the bullet guide between the upper opening and the lower opening such that applying a vacuum to the narrow end causes air to be drawn out of the side opening in the chute and into the broad end of the airflow head.

2. The dust containment manifold of claim 1, wherein the bullet guide is attached to a bullet trap such that bullets passing out of the bullet trap pass generally vertically through the chute as air is drawn out of a side of the chute by the airflow head.

3. The dust containment manifold of claim 2, wherein the chute is defined by a solid side and a perforated side between the upper opening and the lower opening on a side of the chute generally opposite from the solid side, the perforated side having the side opening formed therein and disposed in communication with the broad end of the airflow head.

4. The dust containment manifold of claim 3, wherein the solid side of the bullet guide is angled toward the perforated side.

5. The dust containment manifold of claim 4, wherein the perforated side of the bullet guide is angled in a direction similar to the direction of the solid side.

6. The dust containment manifold of claim 4, wherein the solid side and the perforated side are angled in opposing directions.

7. The dust containment manifold of claim 3, wherein the airflow head is disposed at an angle of at least ten degrees relative to the bullet guide.

8. The dust containment manifold of claim 3, wherein the airflow head is attached to a broad end plate, the broad end plate comprising an interlocking lip adapted to fit inside the openings of the bullet guide.

9. A bullet trap having the dust containment manifold of claim 8 attached thereto and wherein the bullet guide is disposed generally at a bottom quarter of the bullet trap.

10. The dust containment manifold of claim 3, wherein the bullet guide further comprises a retaining protrusion on the perforated side, for securing the airflow head.

11. The dust containment manifold of claim 3, wherein the perforated side comprises at least three side openings.

12. The dust containment manifold of claim 11, wherein at least one side opening of the at least three side openings has a top width and a bottom width, wherein the top width is less than the bottom width.

13. The dust containment manifold of claim 3, wherein the bullet guide is modular, such that several bullet guides may be attached together in a linear row.

14. The dust containment manifold of claim 2, wherein the bullet guide is disposed generally at a bottom quarter of the bullet trap.

15. The dust containment manifold of claim 14, wherein the bullet guide further comprises an attachment flange adapted to conform to an external surface of the bullet trap.

16. The dust containment manifold of claim 1, wherein the bullet guide is removeably attached to airflow head.

17. A dust containment manifold comprising:
an airflow head having a broad end and a narrow end having a single opening, the broad end generally tapering to the narrow end, the narrow end being adapted to attach to a bullet trap ventilation system, the broad end having at least one opening therein; and
a bullet guide having a chute for the communication of bullets and bullet fragments, the airflow head being attachable to the bullet guide, and
wherein the airflow head has a void in the broad end which as has a cross-sectional area of at least 3 times that of a cross-sectional area of a void in the narrow end.

18. A dust containment manifold comprising:
an airflow head having a broad end and a narrow end and void within the airflow head, the broad end generally tapering to the narrow end, the narrow end being adapted to attach to a bullet trap ventilation system, the broad end having at least one opening therein; and a bullet guide having a chute for the communication of bullets and bullet fragments from a bullet trap to a disposal system, the chute having an upper opening and a lower opening, such that bullets from the bullet trap pass into the upper opening and out the lower opening, and at least one side opening between the upper opening and the lower opening, the airflow head being attachable or attached to the bullet guide between the upper opening and the lower opening such that applying a vacuum to the narrow end causes air to be drawn out of the at least one side opening of the chute and into the broad end of the airflow head.

19. The dust containment manifold of claim 18, wherein the void in the airflow head has a cross-sectional area adjacent the first, broad end which is at least 3 times the cross-sectional area adjacent the second, narrow end.

20. The dust containment manifold of claim 18, wherein the airflow head has a generally flat upper surface and a generally flat lower surface.

\* \* \* \* \*